United States Patent [19]
Johnsen et al.

[11] Patent Number: 4,650,520

[45] Date of Patent: Mar. 17, 1987

[54] SLURRY FOR CEMENTING, ESPECIALLY CEMENTING OF LINING PIPES IN DRILL HOLES, AND METHOD FOR PRODUCTION OF SUCH A SLURRY

[76] Inventors: Hans K. Johnsen, Dybdahlsv. 9a; Knut Gaaseidnes, Asbjornsens gt. 30, both of 7000 Trondheim, Norway

[21] Appl. No.: 694,962

[22] Filed: Jan. 25, 1985

[30] Foreign Application Priority Data

Jan. 23, 1984 [NO] Norway ................... 840229

[51] Int. Cl.⁴ .................. C04B 24/08; E21B 33/13
[52] U.S. Cl. ........................... 106/90; 106/94; 106/95; 166/293
[58] Field of Search ............... 106/90, 95, 94; 166/293, 295

[56] References Cited

U.S. PATENT DOCUMENTS

| | | | |
|---|---|---|---|
| 2,071,263 | 2/1937 | Phillips | 106/95 |
| 2,878,875 | 3/1959 | Dunlap et al. | 106/90 X |
| 3,097,955 | 7/1963 | Harris | 106/95 |
| 3,131,075 | 4/1964 | Brooks | 166/293 X |
| 3,865,601 | 2/1975 | Serafin et al. | 106/95 OR |
| 3,884,302 | 5/1975 | Messenger | 166/291 |
| 3,885,985 | 5/1975 | Serafin et al. | 106/95 X |
| 3,887,009 | 6/1975 | Miller et al. | 166/292 OR |
| 4,042,409 | 8/1977 | Terada et al. | 106/111 |

FOREIGN PATENT DOCUMENTS 0915712 11/1972 Canada ...................... 106/95

*Primary Examiner*—William R. Dixon, Jr.
*Assistant Examiner*—Karl Group
*Attorney, Agent, or Firm*—Dennison, Meserole, Pollack & Scheiner

[57] ABSTRACT

A slurry is disclosed which contains a hardening mixture of water and cement, especially for cementing lining pipes into drilling holes. The slurry comprises a first slurry component comprising a dispersion of a hardening cement slurry in a liquid capable of forming an encapsulating membrane, and a second slurry component comprising a hardenable cement containing mixture. By mixing the first and second slurry components, there is formed a dispersion of membrane encapsulated cement particles in a cement slurry.

10 Claims, 2 Drawing Figures

SLURRY FOR CEMENTING, ESPECIALLY CEMENTING OF LINING PIPES IN DRILL HOLES, AND METHOD FOR PRODUCTION OF SUCH A SLURRY

BACKGROUND OF THE INVENTION

The invention concerns a slurry for cementing, especially cementing of lining pipes into drill holes. It also includes a method for production of such a slurry.

Some places it is necessary to tighten openings being subject to pressure from fluids with a cementing slurry, which should be mechanically stable after hardening. This is the case in oil drilling, etc.

In order to protect the integrity of drilled wells, a lining pipe is led down to the bottom. The annulum between the well wall and the lining pipe is filled with a cementing slurry, for instance a cement slurry, from the bottom and completely or partially up to the surface. The lining pipe should prevent solid particles and fluids (oil, gas, and water) from penetrating into the well. The cement slurry composition should primarily prevent communication on the external surface of the lining pipe. In hardened condition it should secure the lining pipe to the surroundings.

These objects are met with satisfaction if the cement slurry composition is placed completely around the lining pipe, and is allowed to harden or solidify without being interrupted. The cement permeability must be less than 0.1 mD (milliDarcy) and the compression strength higher than 100 psi.

Norwegian patent specification No. 144047 discloses a hardening mixture for cementing deep drill holes. A method for such cementing is known from U.S. Pat. No. 3,884,302. Neither of these techniques is totally satisfactory for the purpose.

In ground formations containing gas, known techniques will frequently create problems with the steaming of gas in the annulum space when the cementing slurry is added. Gas can often stream into minor channels or pores in the cementing slurry from a high pressure zone, and into a low pressure zone. Sometimes the gas can penetrate to the surface, or it can be stopped at the well head. This type of gas migration can be dangerous and give blowouts and accidents. Even if the leakage is discovered before this happens, expensive repairs will be necessary.

Several experiments have been made in the nature of these problems.

At the transition from liquid to hardened cementing slurry, a decrease in the hydrostatic pressure can give gas penetration.

Free water that is emitted during the hardening and settling process can develop water pockets in the hardened body. These water pockets can evolve into communication channels for gas when the water is suppressed.

Chemical processes, temperature variations, and filtrate loss can cause creeping of the cementing slurry during the solidifying and hardening period. Mechanical stress during the following drilling and perforating operations may create cracks in the cement.

Difficulties in obtaining good contact with the cementing slurry and the environment, and in suppressing the drilling mud may cause later creation of channels and gas migration. These difficulties have a close relationship to the filter cake of the drilling mud, and its properties. A thin and strong filter cake gives good mud suppression and causes no communication.

Before the solidifying process starts, the cement behaves like a liquid transferring hydrostatic pressure depending on density and depth. Early in the process, the cement stops behaving like a liquid, but rather as a plastic slurry with weak bonds and with free water in the voids between them. A reduction of the volume of the free water in the void structure of the cementing slurry will then cause a pressure reduction in the annulum. The volume can be reduced in two ways. In the solidifying period the water volume is reduced by 0.95-2% because parts of the water create chemical bonds with the cement. The other reduction occurs if some water can leak into the surrounding porous formation. Even with additional substances in the cementing slurry, which reduces the filtrate, this water loss cannot be totally prevented. When the pressure in the cementing slurry sinks under the formation pressure of the gas, it will easily penetrate into the cementing slurry. Gas bubbles will migrate upwards in the solidified slurry and leave channels through which more gas can stream.

Additives are suggested to maintain the pressure in the cement in the solidifying period. These additives create gas bubbles with equal pressure to that of the cementing slurry. By dispersion into the cementing slurry, the gas bubbles will expand when the pressure decreases and thereby maintain the pressure. It is then necessary to have good gas dispersion in order to prevent gas accumulations and channel formation, which is not always obtained.

The problem with the formation of water channels is created because water must be added to the cement slurry in order to enable pumping of the mixture for sufficient time to place the slurry in the well. The problem cannot be solved by letting some water escape by filter loss, because this will cause great pressure reductions in the cementing slurry, but a certain filter loss is desired in order to reduce the amount of free water. Methods for binding the free water that is generating during the solidifying are known, such as addition of bentonite (clay), pozzolan, expanding perlite etc. These additives have little or no effect at the pressure reduction, but give a certain negative effect on other properties of the cementing slurry, such as the ability to be pumped, and the strength.

SUMMARY OF THE INVENTION

The main object of the invention is to make a cementing slurry that eliminates the problem of crank formation and the risk of leakage after hardening. It is especially important to eliminate the problem of vertical communication of fluids at the external surface of lining pipes in oil wells.

The above objects, as well as other objects to be made apparent, are achieved by the use of a hardening cement slurry containing components which harden at different rates. Such a slurry comprises:

a. a first slurry component comprising a dispersion of a hardening cement slurry in a liquid capable of forming an encapsulating membrane;

b. a second slurry component comprising a hardenable cement-containing mixture, whereby mixing said first and second slurry components results in formation of a dispersion of membrane-encapsulated cement particles in a cement slurry.

The present invention also includes a method for the preparation of such a slurry comprising the steps of:

a. forming a slurry of a hardening cement mixture;

b. dispersing this mixture into a liquid capable of forming an encapsulating membrane, to form a first slurry component;

c. dispersing the first slurry component in a second slurry component comprising a hardening cement mixture, to form a dispersion of membrane encapsulated cement particles in a hardening cement slurry.

DETAILED DESCRIPTION OF THE INVENTION

Figure 1:
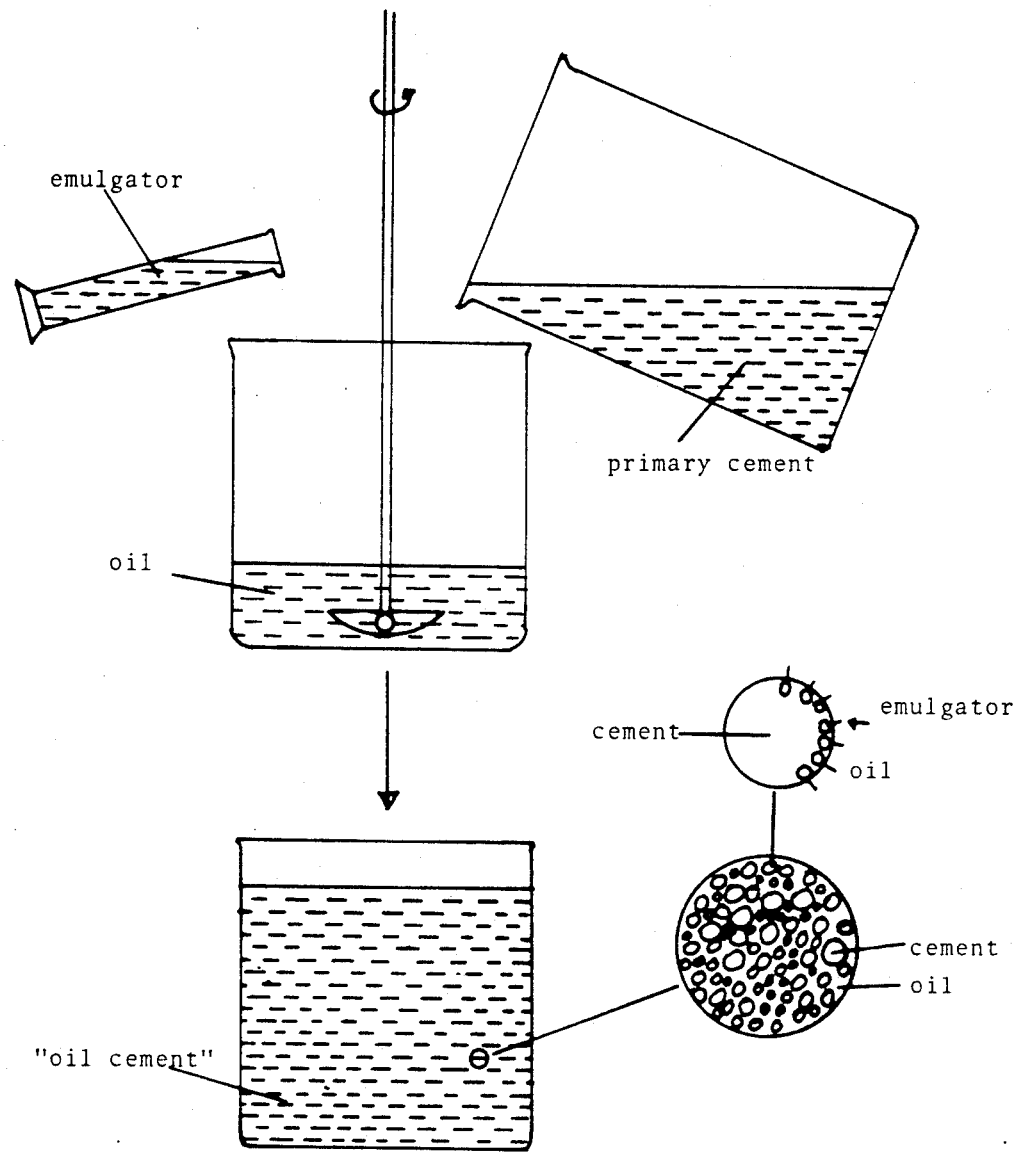
FIG. 1 shows schematically an emulsification of cement into oil and the structure of such an "oil cement"

The new cementing slurry will, according to the invention, prevent migration of fluids (especially gas) during the solidification when ordinary cementing slurry loses its hydrostatic pressure. This is obtained when the cementing slurry solidifies in various stages and when the first stage creates a porous, but sufficiently strong structure, and when the other stages are in the liquid state and can balance out the pressure from the environment.

No water channels will be formed in the part of the cementing slurry that first will harden, because the free water will be taken up in the secondary component by osmosis, while it is still in a liquid state.

The secondary component will fill up cracks and cavities arising in the primary component during the hardening/expansion/contraction, by keeping a part of the cementing slurry as fluid during the hardening.

The secondary component will have an effect as a plastic filter loss reductive agent, and thereby prevent liquid loss (filter loss) to the surroundings.

The invention will also contribute to assure adhesion between the cementing slurry and an oil based filter body in that parts of the cementing slurry are soluble in oil and can be mixed with or diffuse into the filter body.

The invention will also prevent deterioration and formation of cracks due to external mechanical reasons, such as drilling and perforation, because the cementing slurry during the hardening becomes more elastic than prior art mixtures. It is possible to utilize the oil part in oil based drilling mud for production of the drilling slurry, thereby solving the disposal problem which existed for such cementing mud. The invention can also advantageously be utilized in connection with common API-cement as a delayer and friction reducer.

The cementing slurry according to the invention is principally a system with two or more components separated from each other in a homogeneous hardening total slurry. This system is obtained by mixing one component into the others in the form of small form spheres or drops which are encapsulated by a tight or semi-permeable membrane. This membrane can be built up in different ways and with various initial materials. It should preferably, at least temporarily, be able to disperse into or emulsify with another component, especially a cement.

Examples of materials suitable for creation of such a membrane are mineral oils, drying oils, vegetable and animal oils, marine oils and various natural and synthetic polymers, such as silicones, latexes, and natural rubbers.

In the following example production of such a cementing slurry will be set forth, based on the method illustrated in the drawings.

EXAMPLE

A "primary cement" slurry was produced by stirring 1.2 kg cement (API) in 0.5 l household water.

As shown on the left hand side in FIG. 1, 2 ml emulsifier ("Emulsogene OG" ®) was added to 50 ml white oil ("NOH4" ®), a nonionic fatty acid ester, product of Hoechst AG without aromatics, and dissolved by stirring.

Figure 2:
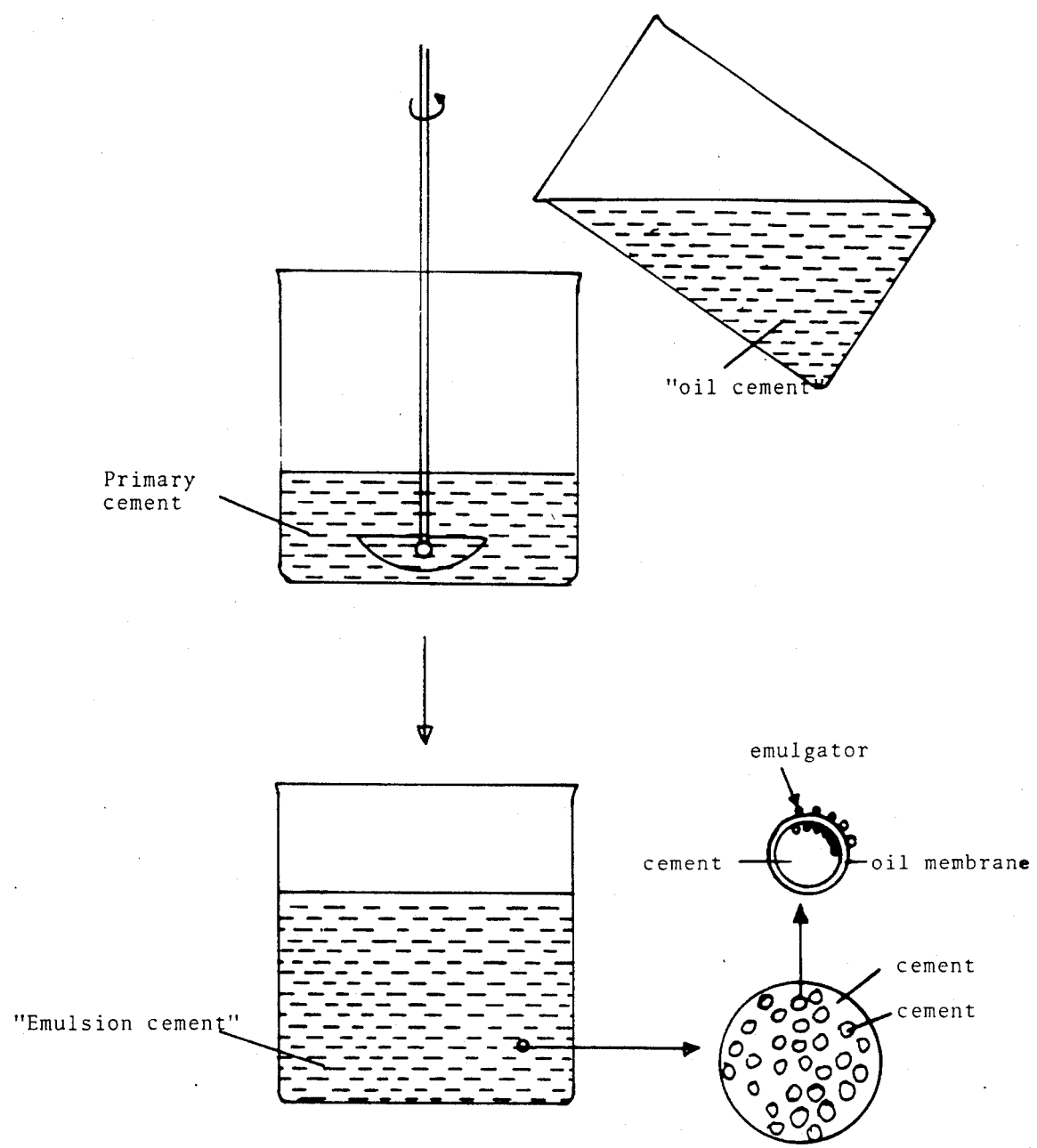
FIG. 2 schematically shows the production of an "emulsion cement" based on the previously produced component, by dispersing of the first component in cement, and also shows the structure of the final cementing slurry in the example.

During slow stirring, 150 ml primary cement slurry was added to this oil/emulsifier mixture, and in this way a stable emulsion of the primary cement slurry in white oil (75 volume percent cement/water phase in oil emulsion) was produced. This mixture called "oil cement (component (a))", was also used as starting material for production of the final cementing slurry, as illustrated in FIG. 2. Here the oil cement was dispersed into the starting cement slurry (component (b)) which corresponds to the primary cement slurry mentioned above. In dispersing oil cement slurry into the starting cement, it is important to prevent air from being mixed into the cement or another gas in the cement oil, that can produce a cream-like consistency that makes the slurry difficult to pump and results in weakening after hardening.

In the example, stirring produced a cementing slurry called "emulsion cement". Several samples were produced with oil cement content as follows: 4, 10, 20, 40 and 60 volume percent. These samples were allowed to solidify at normal pressure (1 atm) and ca. 18° C. Measurements of the compression strengths of the cements showed that all of them had satisfactory strength of more than 100 psi. The hardening time increased with the content of oil cement. It was also found that emulsion cement produced in this way has particularly good adhesion to mineral and metallic surfaces. This adhesion increased with the content of oil cement in the final cementing slurry.

Similar experiments were also made based on medical paraffin and soya oil in production of oil cement. The cementing slurry that was produced in this way had properties similar with those mentioned above.

Oil cement was also produced based on "Invermul" ®, emulsifier, a maleic-tall oil amide in petroleum solvent, product of NL Barold/NL Industries, Inc., and diesel oil with the same result as with the emulsifier in the beforementioned example. It was, however, more difficult to obtain a stable oil cement in this way. It was not possible to emulsify more than 50 volume percent of the cement slurry into the oil. The reason for this is probably that separating walls (the membranes) in the emulsion cement grow thicker. This shows that it is possible to control the membrane thickness by the selection of emulsifier.

In FIG. 1 the structure of the oil cement is illustrated. It is shown how the emulsifier covers the cement particles as a membrane and keeps them separated from each other in the oil.

In FIG. 2 an illustration of the structure of the final mixed cementing slurry is given. Here the oil membrane will make a separating barrier between the two cement slurry parts, i.e. the particles of the "oil cement" being emulsified into the oil and the other cement slurry component.

What is claimed is:

1. A slurry containing a hardening mixture of water and cement, for cementing lining pipes into drilling holes, consisting essentially of a mixture of:
   (a) a dispersion phase of membrane encapsulated particles of a first cement and water slurry which hardens at a first rate; in
   (b) a matrix phase of a second cement and water slurry which hardens at a second rate;
   wherein said mixture comprises about 4 to 60% by volume of said membrane encapsulated particles;
   wherein said membrane comprises a liquid which is emulsifiable with or dispersible in water; and
   wherein free water from the phase which hardens first is taken up in the other phase, which has not yet hardened.

2. A slurry according to claim 1, wherein said liquid is an oil or a polymer.

3. A slurry according to claim 1, wherein said first component contains 75% by volume of said first cement and water slurry.

4. A slurry according to claim 2, wherein said liquid is selected from the group consisting of mineral oils, drying oils, vegetable oils, animal oils, marine oils, and natural and synthetic polymers.

5. A slurry according to claim 1, wherein said liquid contains an emulsifier suitable for forming a water in oil emulsion.

6. A slurry according to claim 5, wherein said liquid contains about 4% by volume emulsififer.

7. A slurry according to claim 4, wherein said liquid is a natural polymer which is a natural rubber.

8. Method for preparation of a hardening slurry for cementing lining pipes into drilling holes, comprising,
   (a) forming a first slurry of a hardening cement and water mixture;
   (b) dispersing said first slurry into a liquid capable of forming an encapsulating membrane, and which is emulsifiable with or dispersible in water, to form a first component; and
   (c) dispersing said first component in a second component comprising a second slurry of a hardening cement and water mixture, to form a dispersion of membrane encapsulated first cement and water slurry particles in said second cement and water slurry, the amount of said first component dispersed being about 4 to 60% by volume of the total of said first and second components.

9. Method according to claim 8, wherein said liquid comprises an oil and an emulsifier for said oil.

10. Method according to claim 8, wherein said drill holes are sub-sea drill holes.

* * * * *